No. 726,302. PATENTED APR. 28, 1903.
J. D. IHLDER.
ELECTRICAL CONTROL OF ELEVATORS.
APPLICATION FILED APR. 11, 1902.
NO MODEL. 2 SHEETS—SHEET 1.

Witnesses  
Inventor  
John D. Ihlder  
By  
Attorneys

No. 726,302. PATENTED APR. 28, 1903.
J. D. IHLDER.
ELECTRICAL CONTROL OF ELEVATORS.
APPLICATION FILED APR. 11, 1902.
NO MODEL. 2 SHEETS—SHEET 2.

Witnesses
Inventor
John D. Ihlder
By
Attorneys

UNITED STATES PATENT OFFICE.

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

ELECTRICAL CONTROL OF ELEVATORS.

SPECIFICATION forming part of Letters Patent No. 726,302, dated April 28, 1903.

Application filed April 11, 1902. Serial No. 102,470. (No model.)

*To all whom it may concern:*

Be it known that I, JOHN D. IHLDER, a citizen of the United States, residing at Yonkers, in the county of Westchester and State of New York, have invented certain new and useful Improvements in Electrical Control for Elevators, of which the following is a specification.

My invention relates to the control of motors in general, but more particularly to the control of electric motors for elevator-service; and the objects of my invention are to improve upon that class of elevator-controlling apparatus utilizing both alternating currents and direct or rectified currents in the motor-controlling circuits, whereby safety and certainty of operation are secured and saving of current obtained.

Further objects of my invention will hereinafter appear in the specification.

To these ends my invention consists in the apparatus for carrying out the above objects having the general mode of operation substantially as hereinafter fully described, and shown in the accompanying specification and drawings, in which—

Figure 1:
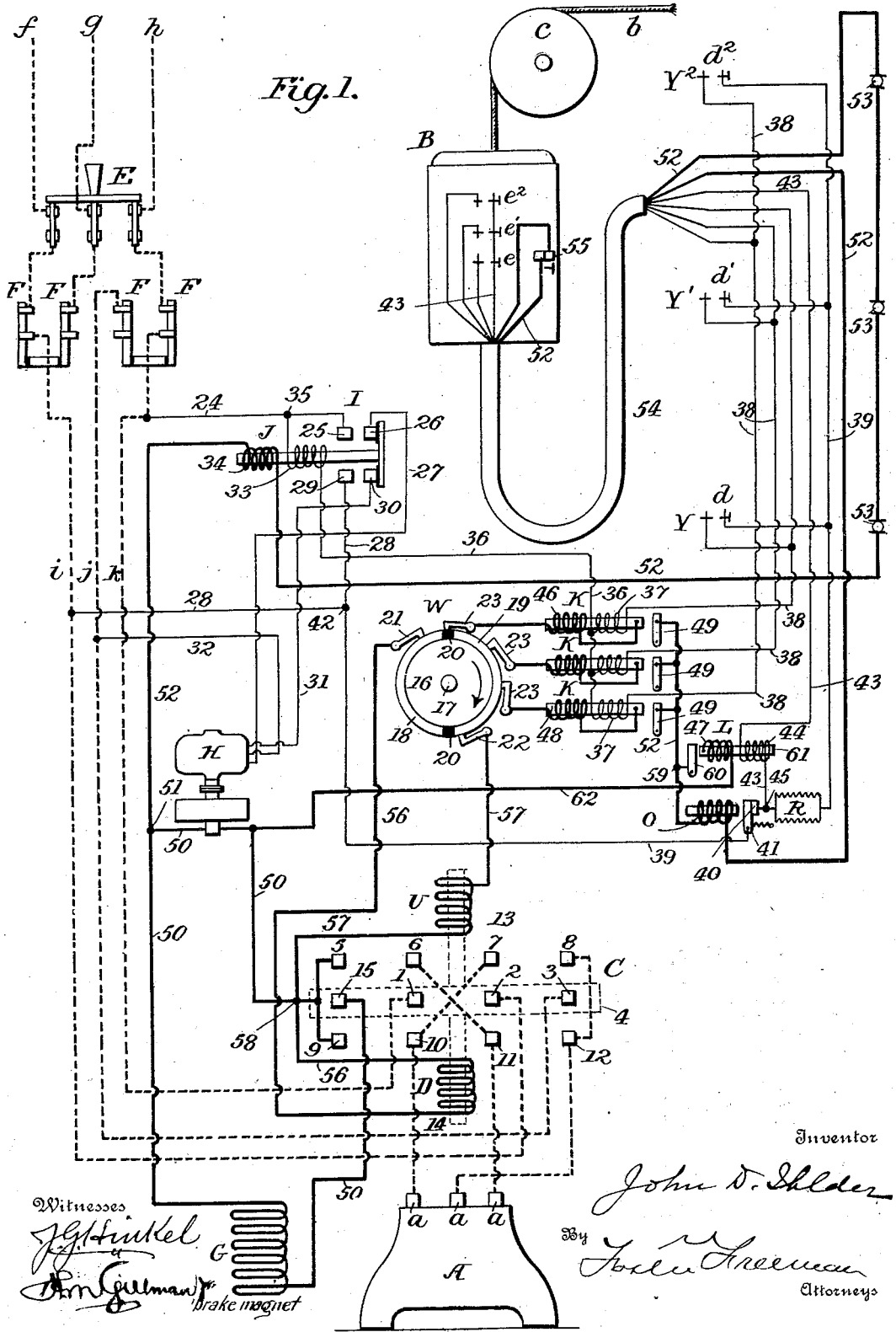
Figure 2:
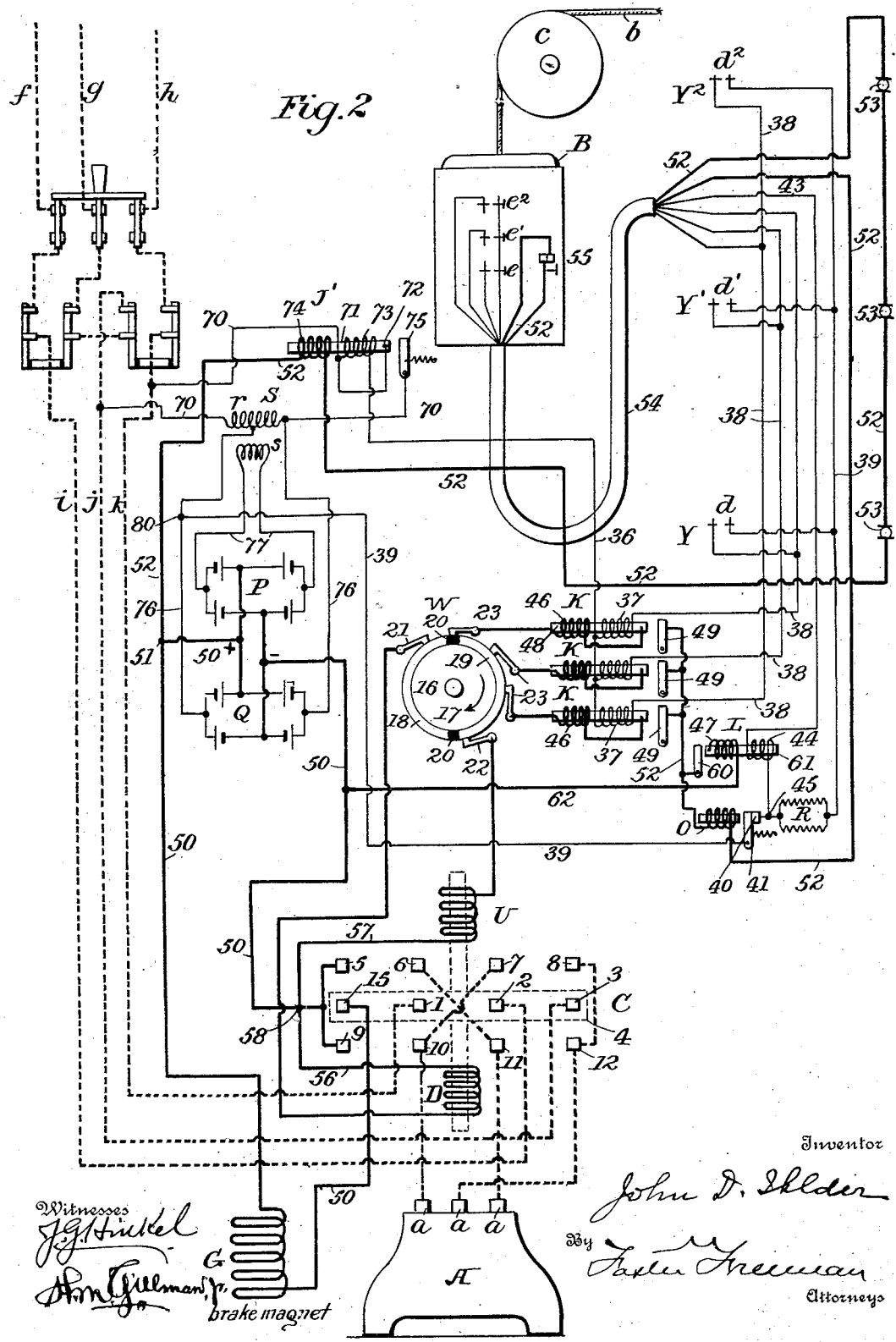

Figure 1 is a diagrammatical representation of circuits and apparatus embodying my invention, and Fig. 2 is a diagrammatical representation embodying a modification of my invention.

Referring to the drawings, A represents an electric motor, shown in this instance as an alternating-current motor which may be of any suitable type. I have merely indicated the motor diagrammatically and shown the motor provided with binding-posts $a$ for a three-phase circuit, which I have chosen to illustrate my invention.

Suitable means should be provided connecting the motor A with a car B; but a portion only of such connection is illustrated for the sake of simplicity, a cable $b$ being shown connected to the car and passing over the shaft $c$. Any suitable connection may, however, be provided for connecting the motor to operate the car, and such mechanical connections form no part of my invention.

In the system of elevator control illustrated in the diagrams means are provided for controlling the operation of the car both from the car and from a series of stations $Y$ $Y'$ $Y^2$, and push-buttons or switches $d$ $d'$ $d^2$ are provided at the stations, while push-buttons $e$ $e'$ $e^2$, corresponding to the floors or stations, are provided upon the car. Any suitable number of stations and push-buttons may be used, I having shown but three stations and a push-button for each station in order to illustrate my invention in elevator-controlling apparatus of the class to be described. Upon the manipulation of a push-button at the station or on the car the motor will be set in operation to move the car in one direction or another and bring it automatically to a stop at the desired station. In such elevator-controlling apparatus means are provided, such as a suitable reversing-switch C, for controlling the direction of rotation of the motor, and in this instance a floor-controller D is connected in circuit for breaking the controlling-circuits and stopping the motor automatically at the desired stations.

According to my invention a portion of the motor-controlling circuits are provided with currents of low potential, since it is undesirable to supply currents of high potential to controlling-circuits which lead throughout the elevator-well and to the car. While various means may be utilized for supplying current of low potential, I prefer to use a rectified or direct current obtained either from a rotary transformer or from electrolytic current-rectifying cells, which may be so grouped in sets as to rectify both the positive and negative portions of an alternating current. In this instance the rectifying-current for the controlling-circuits is supplied from the high-potential alternating-current mains $f$, $g$, and $h$, although I am not to be understood as limiting myself to this arrangement, since a separate source of alternating current might be utilized for supplying the alternating current to the rectifying apparatus. It is, however, convenient to obtain the rectified current from the alternating-current mains, and I prefer such an arrangement of apparatus that the rectified current obtained for the controlling-circuits shall be of lower potential than the current supplied by the motor.

I will now proceed with a detailed description of the arrangement of circuits in my improved controlling apparatus.

As hereinbefore stated, the alternating-current mains $f$, $g$, and $h$ supply alternating current to the motor A, and, as shown, they are connected, through a suitable switch E, to the leads of the motor. Additional knife-edge switches F are shown arranged in the circuit of the leads to the motor. From the knife-edge switch F the leads $i$, $j$, and $k$ connect with contacts 1, 2, and 3 on the armature 4 of the reversing-switch C. This armature 4 is adapted to be moved to one side or the other of the center and complete circuit between its contacts and series of contacts 5 6 7 8 and 9 10 11 12 on each side of the center. Suitable means are provided for actuating the armature 4. As shown in this instance, up and down relays U and D are provided, having cores 13 and 14 connected to the armature 4, whereby upon one of the relays U and D becoming energized the armature 4 is moved in one direction or the other to complete circuit between its contacts and those at the side thereof. The leads $i$, $j$, and $k$ are connected, respectively, to the contacts 2, 3, and 1 on the armature 4, while the contacts 6 7 8 and 10, 11, and 12 are connected to the binding-posts $a$ on the motor. The arrangement of circuits and contacts is such that current from the lead $j$ will always pass to the center one of the binding-posts on the motor no matter in which direction the reversing-switch is moved; but, as shown, contacts 6 7 and 10 11 are cross-connected, so that the direction of rotation of the motor will be reversed according to the movement of the switch.

While I have described a particular form of reversing-switch, I am not to be understood as limiting myself to this switch nor to the connection shown for causing reversal of the motor, for any suitable means may be provided for accomplishing the ends in view.

An additional contact 15 is provided upon the armature 4 of reversing-switch C, to which is connected the circuit of the brake-magnet G, adapted to electromagnetically operate any suitable brake for the motor. The brake and operating mechanism therefore form no part of my present invention, and I have therefore merely illustrated the brake-magnet diagrammatically to show in what manner the magnet itself becomes energized and is deenergized in the operation of the apparatus. A circuit of the brake-magnet G is controlled by the operation of the reversing-switch C, and when contact 15 is moved into contact with either contacts 5 or 9 the circuit of the brake-magnet G will be completed.

The function of the floor-controller W is to control the circuits of the up and down relays U and D, thereby controlling the operation of the reversing-switch and the starting and stopping of the motor, as well as its direction of rotation.

Any suitable form of floor-controller may be used. I have shown the floor-controller diagrammatically and have not shown the mechanical connections between it and the motor, as any suitable mechanical connections may be provided for causing rotation of the floor-controller W in unison with the traveling of the car so that the proper circuits may be made and broken at the proper times to start the car and stop it at the desired station automatically. The floor-controller consists, essentially, of a disk 16, carried upon a shaft 17 and provided with conducting-segments 18 and 19, insulated from each other by suitable insulation 20. Bearing upon the disks 18 and 19 are brushes, the brushes 21 and 22 being connected, respectively, to the down relay D and to the up relay U, while brushes 23 correspond, respectively, to the floors or stations Y, Y', and $Y^2$. In the operation of the apparatus for energizing one of the relays U or D—as, for instance, in order to energize the relay U—a circuit would be completed from one of the brushes 23 through one or the other of the conducting-segments 18 19 to the brushes 22 and from thence to the relay U. In the position of the parts as shown in the diagrams it is to be assumed that the car B has been brought to the first floor Y and there stopped, in which position the brush 23 corresponding to floor Y is shown resting upon one of the insulating portions 20 of the disk and the parts are in readiness for the completion of a circuit through the up relay U in order to close the circuit to the motor and cause it to rotate in a direction to move the car upward. When one of the portions 23 through which circuit has been completed passes on to one of the insulating portions 20, the circuit will of course be broken to that relay to which circuit was completed and the motor-circuit will be broken to stop the motor. Assuming that the car is to be moved upward, the direction of rotation of the disk 16 would be according to the arrow, the brushes all remaining stationary.

Circuits and connections are provided connected to the car and stations and through the floor-controller W and up and down relays U and D, some of these controlling-circuits and connections being adapted to be energized by alternating current, and those circuits shown by light continuous lines are assumed to be energized by alternating current, in this instance derived from the main alternating-current circuit. The remainder of the controller-circuits and connections for the motor are shown as energized by direct or rectified current, preferably of lower potential than that of the main motor-circuit, although I am not to be understood as limiting myself in this respect.

In Fig. 1 a rotary transformer H is shown with the motor end connected in the alternating-current circuit, while the generator end supplies direct or rectified current to the controlling-circuits indicated in heavy continuous lines.

A switch I controls the circuit of the motor end of the rotary transformer H, as shown, a wire 24 is connected from the lead $h$ to the contact 25, while from contact 26 a wire 27 is connected to the rotary transformer. From lead $i$ a wire 28 is connected to contact 29, while from contact 30 a wire 31 leads to the rotary transformer, and from the transformer a wire 32 connects to the lead $j$. From the connections described it will be seen that when switch I is closed the rotary transformer will be set in operation.

Means are provided (shown in this instance as a doubly-wound electromagnet J) for actuating switch I, the alternating-current coil 33 of said magnet being provided for initially closing switch I, while the direct or rectified current coil 34 is a holding-coil and maintains the switch I closed after the circuit of the coil 33 has been broken. By this means even after the circuit of the coil 33 has been broken the rotary transformer H will be maintained in operation for supplying rectified current to the controlling-circuits of the motor.

I will now describe the alternating-current circuits connected to the car and station. From a point 35 on the wire 24 adjacent switch I a circuit is led through the coil 33 and from thence by wire 36 to the doubly-wound electromagnets K, and from here the circuit branches through alternating-current coils 37 of said doubly-wound magnets K. Each branch leads by wire 38 to one side of push-buttons $d$, $d'$, and $d^2$, while the other sides of each of the push-buttons are connected to a common lead-wire 39, the circuit of which includes compensating resistance R and contacts 40 and 41. From contact 41 the return-circuit is completed still by wire 39 back to a point 42 on wire 28 and from thence to the lead $i$. It will be seen that the circuit of the station push-buttons $d$, $d'$, and $d^2$ is energized by alternating current through circuits derived from the mains $i$ and $k$, although any other suitable arrangement of circuits derived in any operative manner may be provided. The push-buttons $e$, $e'$, and $e^2$ on the car corresponding to the floors or stations are connected in parallel with those at the floors or stations; but a separate common return-wire 43 is provided for the car push-buttons. The common return-wire 43 includes alternating-current coil 44 on the doubly-wound non-interference magnet L and is connected to a point 45 adjacent to the resistance R, and preferably between said resistance and contact 40. The contact 40, as shown, is stationary, while contact 41 is pivoted and adapted to be retracted by a spring against contact 40. The return-circuit of the wire 43 from the car push-buttons is through contacts 40 and 41 and by wires 39 and 28 to the lead $i$.

I will not describe the direct or rectified current controlling circuits. It may be stated generally that the direct-current-controlling circuits include in addition to the up and down relays U and D and the brake-magnet G the winding 34 of doubly-wound magnet J and the windings 46 of the doubly-wound magnets K, as well as winding 47 of doubly-wound non-interference magnet L and the non-interference magnets O. The coils and windings 34, 46, and 47 are holding-coils adapted to maintain certain contacts closed after they have been actuated by alternating-current windings. The doubly-wound magnets K are provided with cores 48, to which the circuits of the winding 46 are electrically connected, and movable contacts 49, connected in the rectifying-current circuit, are adapted to be actuated by magnets K.

From the positive brush of the rotary transformer H direct current passes by the wire 50 to a point 51, and from thence the circuit branches, one branch continuing still by the wire 50 to and through brake-magnet G and from thence to contact 15 on the reversing-switch C, and from thence the circuit is completed through 5 or 9 still by wire 50 back to the negative brush of the rotary transformer.

Returning again to the point 51, it will be seen that another circuit branches by wire 52 to and through winding 34 on magnet J, and from thence still by wire 52 through door-contacts 53, and from thence through the flexible cable 54 to a safety-switch 55 on the car, and from thence back through flexible cable 54 still by wire 52 to and through non-interference magnet O, and from thence still by wire 52 to points adjacent to armature 49, each of which is connected by a branch wire to the wire 52. Assuming that one of the armatures 49 has been attracted against the core 48, it will be seen that the circuits will be completed through one of the windings 46 of a magnet K. From each of the windings 46 electric connection is made with the brush 23 on the floor-controller W, and, according to the position of the floor-controller, the circuit will be completed through one or the other of the brushes 21 or 22 by a wire 56 or 57 to the down relay D or to the up relay U. The circuit of each of the relays U and D is connected to a common junction-point 58 on the wire 50, and from thence the circuit is completed back to the negative brush of the rotary transformer H.

A branch circuit energized by direct current is adapted to be completed from the point 59 on the wire 52 adjacent magnet L to and through spring-retracted armature 60 to the core 61 of magnet L, to which the winding 47 of said magnet is electrically connected, and from thence to and through the winding 47 and by wire 62 back to the negative brush of the rotary transformer. When the alternating-current winding 44 of magnet L is energized, it attracts the armature 60 against the core 61, thereby completing the circuit of the winding 47, so that when the circuit of the alternating current 44 is broken direct-current winding 47 acts as a holding-magnet.

The function of the non-interference magnet O is to attract the movable spring-retracted armature 41 and maintain the circuit broken between the contacts 40 and 41 during a given time.

One of the objects, as hereinbefore stated, of my invention is to prevent accidents in elevator apparatus, and to this end I provide means whereby control of the motor and the elevator-car is excluded from the stations after the car has come to rest—that is to say, after the car has been started by the operation of a car push-button and the desired station has been reached and the car has come to rest—the elevator-motor cannot again be set in operation from the stations until the control has been restored to the stations from the car by the operation of the safety-switch 55, or else the control may be restored by the operation of some other suitable switch, as by the opening and closing of door-contact 53. In the case of the safety-switch 55 on the car, in order to restore control of the motor to the station after the car has come to rest the switch must be opened and then again closed, and the same is true of the door-contacts. In other words, the door-switch must have been opened and then again closed.

The operation described is designed to prevent accidents and increase the safety of operation of elevator-controlling apparatus, because the control of the motor and the car is left entirely in the hands of the operator on the car after the car has come to rest. Should the elevator-car have been started from a station, it would not be desirable nor necessary to leave the control of the car entirely at the will of the operator from the station, for confusion might arise, and therefore, according to my apparatus, after the car has been started from a station and come to rest it may again be started from either a station or from the car.

This broad invention above described has been patented by me in United States Patent 683,689, granted October 1, 1901; but it will be seen in the present instance means are provided for accomplishing the same ends, but with a different arrangement of circuits. In other words, the same general operation is provided for as described in the aforesaid patent, but by means of a combined arrangement of alternating-current circuits and direct or rectified current circuits.

The operation of the apparatus will now be preferably described. Let it be assumed that the car is at the lowermost station Y and that it is desired to cause it to move to the uppermost station $Y^2$ by the operation of the push-button $d^2$ at station $Y^2$. Assuming that the position of the apparatus is as shown in the diagram of the figures, upon manipulating push-button $d^2$ an alternating circuit will be completed, as hereinbefore described, including the alternating-current winding 33 of magnet J, also including the alternating-current winding 37 of one of the magnets K corresponding to the station $Y^2$, and including the compensating resistance R and contacts 40 and 41, which are normally closed. The energizing of winding 33 of magnet J causes the closure of switch I, thereby completing the circuit to the rotary transformer H and causing it to rotate and supply direct or rectified current to the electric circuits of the apparatus. The energizing of winding 37 or magnet K attracts armature 49 and completes the direct-current circuit in readiness to be energized by current from the rotary transformer. As hereinbefore described, the direct-current circuit (illustrated in heavy lines) includes the brake-magnet G, and in this instance, since it is desired to move the car upward, it will include the upward relay U, and it will also include the winding 34 of magnet J, the door-contacts 53, the safety-switch 55 on the car, the non-interference magnets O, armature 49, core 48, winding 46 of magnet K, brush 23, segment 19, brush 22, and out to the rotary transformer. The energizing of relay U actuates the reversing-switch C and closes the circuit of the motor, causing it to rotate in a direction to move the car upward. The closing of the reversing-switch also energizes the brake-magnet, which serves to remove the brake. The energizing of the non-interference magnet O attracts armature 41 and causes a break between contacts 40 and 41 in the return-circuit from the push-buttons to the stations, and as long as non-interference magnet O remains energized interference with the movements of the car will be prevented from the stations, because the controlling-circuits returning from the stations are all broken between contacts 40 and 41. Likewise interference with the movements of the car from one of the push-buttons on the car is prevented, because the return-circuit from the car push-buttons is also broken between the contacts 40 and 41 as long as magnet O remains energized. The breaking of the alternating-current push-button circuits at contacts 40 and 41 also serves to deënergize the winding 33 of magnet J and the winding 37 of magnet K; but the direct-current windings 34 and 46 of said magnets serve to maintain the switch controlled by said magnets closed. The motor will continue to rotate and move the car upward, and the floor-controller W will be rotated in the direction of the arrow until insulation 20 comes opposite brush 23, through which circuit is made. When this happens, the car will have reached station $Y^2$, the circuit of relay U will be broken, and the car brought to a stop. The same operation will take place for any floor or station; but it is unnecessary to describe the means by which the circuits are completed from any other station push-button. When the car is operated by the manipulation of a push-button on the car, it will be seen that an alternating-current circuit is completed by the closure of a car push-button, and the circuit in this instance will include the winding 33 of magnet J and winding 37 of one of the magnets K; but the return-circuit from the push-buttons being different from the station push-buttons it will be seen that winding 44 of magnet L will be included in the circuit of the car push-button. The operation of the apparatus is the same thereafter as that described in connection with the starting of the motor from a station push-button, with the exception that after the car has come to rest the control of the motor is still in the hands of the car operator. The energizing of winding 44 of magnet L serves to attract armature 60 against the core 61 and completes the circuit of magnet 47, so that after the magnet 44 is cut out of circuit at the contacts 40 and 41 the magnet or winding 47 still remains in circuit, thereby maintaining complete circuit from the positive brush of the rotary transformer H by wires 50 and 52, through winding 34 of magnet J, through the door-contacts 53 and safety-switch 55 on the car, through non-interference magnet O, and through winding 47 of magnet L back by wire 62 to the negative brush of the rotary transformer. Since this circuit just described remains closed after the car has come to rest, it will be seen that the circuit to the push-buttons will be maintained broken at the contacts 40 and 41, so that the car cannot again be started from the floors or stations until the control of the stations has been restored. This may be done by the opening and closing of the safety-switch 55 on the car or else by the opening and closing of a door-switch, thereby restoring the apparatus to a normal condition in readiness to be again set in operation from either the floors or from the car.

In Fig. 2 substantially the same apparatus is diagrammatically illustrated as that shown in Fig. 1, with the exception that groups of electrolytic cells P and Q are provided for rectifying the alternating current and energizing a portion of the controlling-circuits of the apparatus. It will therefore be unnecessary to describe in detail all the different parts of the apparatus and the circuits and connections, since the reference letters and figures indicate the same parts and circuits in each diagram, and the operation of the system illustrated in Fig. 2 is the same as that illustrated in Fig. 1. In this instance in Fig. 2 in order to produce the rectified current for the controlling-circuits an autotransformer S is arranged in the alternating-current circuit and connected between two of the alternating-current mains, as $g$ and $h$, while the groups of cells P and Q are connected to rectify both phases of the alternating current taken from the autotransformer. By this arrangement since the alternating currents supplied from the transformer overlap in phase a comparatively smooth direct current is obtained from the cells suitable for operative purposes.

The electrolytic rectifying-cells I prefer to use are those in which there is an electrode of aluminium (indicated in the figures by the character $a'$) and another electrode of carbon or some such substance, (indicated by $c$,) and, as is well known, a cell composed of such electrodes immersed in a suitable electrolyte possesses the property of allowing but one portion of an alternating current to pass when the aluminium electrode is connected to the positive terminal of a source of supply of alternating current—that is to say, the positive portion of the alternating current is prevented from passing in the direction from the aluminium electrode to the carbon electrode, while the negative portion of the current may pass from the carbon to the aluminium. By a proper grouping of such cells and electric connections both portions of the alternating current may be rectified and supplied to an electric circuit.

In the grouping of cells shown in Fig. 2 both the positive and negative portions of the alternating currents in the secondary $s$ of the autotransformer S are rectified by the grouping of cells P, while both portions of the current in the circuit connected to points on the primary $r$ are rectified by the other group of cells Q. The particular grouping of cells illustrated is well known in the art, and the rectified current therefrom is obtained in the circuits indicated by heavy continuous lines connected to the group of cells.

Referring more particularly to the circuits in Fig. 2, it will be seen that from the lead $k$ connection is made, by means of a wire 70, to the core 71 at the point 72 of a doubly-wound electromagnet J', provided with an alternating-current winding 73 and a rectified-current winding 74. This magnet J' is adapted to attract a spring-controlled contact 75, from which contact a circuit leads, by means of wire 70, to and through the primary winding $r$ of the transformer S and from thence, still by wire 70, to the lead $j'$. The alternating-current winding 73 on magnet J' is connected from a point on the wire 70 to the winding 37 on the doubly-wound magnet K, and from thence the alternating-current circuits are the same as those described in connection with Fig. 2.

From points on the primary winding $r$ of the transformer circuits are led, by means of wires 76, to the groups of cells Q, while from the secondary $s$ of the transformer circuits are led, by means of wire 77, to the groups of cells P, whereby alternating currents are supplied to the groups of cells P and Q, and the rectified currents therefrom are led from the point marked + on the electric connection between the cells and returned to the cells at the point marked − on the electric connections between the cells, the rectified currents following the circuits indicated by heavy continuous lines. The points marked + and — on the connections between the cells correspond to the positive and negative brushes of the rotary transformer H, (illustrated in Fig. 1,) and the circuits and connections for direct current are the same as those indicated in Fig. 1, and the reference characters indicate the same circuits. The analogy between the cells and the rotary transformer being very complete, it should not be necessary to describe in detail again all of the circuits, for the description of Fig. 1 applies to Fig. 2. It will be pointed out, however, that the return-wire 39, returning from contacts 41 of non-interference magnet O, is connected to a point 80 on the wire 76, which leads to the primary of the transformer S, thus forming a complete return-circuit for the alternating current in the controlling-circuits.

In the operation of the apparatus shown in Fig. 2 the alternating-current winding 73 of magnet J' becomes energized upon the manipulation of a push-button at a station or on the car, and then after the circuit of the winding 73 has been broken at contacts 40 and 41 by the energizing of non-interference magnet O a rectified-current winding 74 of magnet J' operates to maintain contact 75 against the core 71, thereby maintaining the circuit completed to the primary of the transformer.

I am not to be understood as limiting myself to the precise arrangement of cells and circuits therefor nor to the arrangement of transformer in circuit, for the cells could be readily used without any transformer.

Obviously some features of my invention may be used without other features, and my invention may be embodied in widely-varying forms, for it is possible to attain the same objects I have in view by many and various arrangements of circuits and apparatus.

Without, therefore, limiting myself to the apparatus and construction shown and described and without enumerating equivalents, I claim and desire to obtain by Letters Patent—

1. In elevator-controlling apparatus, the combination of high and low potential controlling-circuits, so connected that control of the elevator-motor is excluded from the stations after the car has come to rest, substantially as and for the purposes set forth.

2. In electric controlling apparatus for elevators, the combination of controlling-circuits of different potentials, each of which controls the other in such manner that control of the car from the stations is prevented after the car has come to rest, substantially as and for the purposes set forth.

3. In electric controlling apparatus for elevators, the combination of motor-controlling devices, and circuits of different potentials including the same, so arranged that the starting control is excluded from one controlling device after the car has been started from the other, until the car is stopped and control is restored, substantially as and for the purposes set forth.

4. In electric controlling apparatus for elevators, the combination of motor-controlling devices, and circuits of different potentials including the same, so arranged that the starting control is excluded from one controlling device after the car has been started from the other until the car is stopped and control is restored, and means for restoring such control, substantially as and for the purposes set forth.

5. In electric controlling apparatus for elevators, the combination of motor-controlling devices, and circuits of different characters and potentials including the same, so arranged that control of the motor is excluded from one of said devices, after the motor has been started from the other, substantially as and for the purposes set forth.

6. In elevator-controlling apparatus, the combination of motor-controlling devices, and circuits of different characters including the same, so combined and connected that interference with the operation of the motor is prevented from one of said devices after the motor has been started from the other, and has come to rest, substantially as and for the purposes set forth.

7. In elevator-controlling apparatus, the combination of alternating-current and rectified-current motor-controlling circuits, so arranged that interference with the operation of the motor is prevented after the car has been started and has come to rest, substantially as and for the purposes set forth.

8. The combination with a motor, car and station, of circuits for controlling the motor from the car and station, means for supplying said circuits with current of low potential, and means for excluding control of the car from the station, after the car has come to rest, substantially as and for the purposes set forth.

9. The combination with a motor, high-potential supply-mains therefor, a car and station, of circuits for controlling the motor from the car and station, means for supplying said circuits with current of low potential from said high-potential mains, and means for excluding control of the car from the station after the car has come to rest, substantially as and for the purposes set forth.

10. The combination with a motor, car and stations, of controlling-circuits including motor-controlling devices connected to the car and stations, means for energizing said controlling-circuits with rectified current of low potential, and means whereby control of the car is excluded from the stations after the car has come to rest, substantially as and for the purposes set forth.

11. The combination with a motor, car and station, of controlling-circuits including motor-controlling devices connected to the car and station, means for supplying rectified current to said controlling-circuits and means for excluding control of the car from the station, after the car has come to rest, substantially as and for the purposes set forth.

12. The combination with a motor, high-potential supply-mains therefor, a car and station, of circuits for controlling the motor from the car and station, means for supplying said circuits with current of low potential from said high-potential mains, and means for excluding control of the car from the station, after the car has come to rest, until the station control has been restored from the car, substantially as and for the purposes set forth.

13. In apparatus for controlling elevators, the combination with an elevator-motor, of push-buttons for each floor or station, push-buttons on the car, corresponding to the several floors or stations, with circuits and connections including the push-buttons and means for controlling the operation of the motor, means for supplying rectified current of low potential to said circuits and connections, and means for preventing the subsequent control of the motor from a floor or station after it has been operated from the car, and the motor has come to rest, substantially as and for the purposes set forth.

14. In apparatus for controlling elevators, the combination with a motor for operating the car in either direction, of a push-button for each floor or station, push-buttons on the car corresponding to the several floors or stations, and controlling-circuits and connections between the push-buttons and the motor, so arranged that when any push-button is operated circuits are completed and the motor operated to bring the car to the station corresponding with the push-button, means for supplying rectified current to said controlling-circuits and connections, and means for preventing the subsequent operation of the motor, from a floor or station after it has been started from the car and stopped, substantially as and for the purposes set forth.

15. The combination with a car and station of an alternating-current motor, circuits for controlling the motor from the car or station, means for energizing said circuits with rectified current and means for preventing the subsequent operation of the motor from the station after the car has come to rest, substantially as and for the purposes set forth.

16. The combination with a car and station of an alternating-current motor, circuits for controlling the motor from the car or station, means for energizing said circuits with rectified currents and means for preventing the subsequent operation of the motor from the station after the car has come to rest, until control is restored to the station, substantially as and for the purposes set forth.

17. The combination with a car and station of a motor and alternating-current, supply-mains, circuits for controlling the motor from the car and station, means for rectifying a portion of the current from said mains and supplying it to said circuits and means for preventing the control of the motor from the station after the car has come to rest, substantially as and for the purposes set forth.

In testimony whereof I have signed my name to this specification in the presence of two subscribing witnesses.

JOHN D. IHLDER.

Witnesses:
FREDERICK W. NEWELL,
CHARLES B. MANVILLE.